United States Patent [19]

Chihara et al.

[11] Patent Number: 4,960,256

[45] Date of Patent: Oct. 2, 1990

[54] HOLDING STRUCTURE FOR DISPLAYING APPARATUS

[75] Inventors: Shuichi Chihara, Tokyo; Ryuta Kanno; Akitoshi Okuma, both of Kanagawa, all of Japan

[73] Assignee: Sony Corporation, Tokyo, Japan

[21] Appl. No.: 385,464

[22] Filed: Jul. 27, 1989

[30] Foreign Application Priority Data

Aug. 8, 1988 [JP] Japan ................................ 63-197720
Dec. 19, 1988 [JP] Japan ................................ 63-319885

[51] Int. Cl.$^5$ ............................................. F16M 13/00
[52] U.S. Cl. .......................................... 248/284; 16/361; 16/366; 16/371; 248/291; 248/917
[58] Field of Search ............... 248/917, 918, 284, 291; 16/357, 360, 361, 366, 371

[56] References Cited

U.S. PATENT DOCUMENTS

| | | | |
|---|---|---|---|
| 1,920,898 | 8/1933 | Soule | 16/360 |
| 2,208,887 | 7/1940 | Westwood | 16/360 |
| 2,335,581 | 11/1943 | Cocanour | 16/366 X |
| 2,721,635 | 10/1955 | Fullerton | 16/357 X |
| 3,388,417 | 6/1968 | Upchurch | 16/360 X |

FOREIGN PATENT DOCUMENTS

| | | | |
|---|---|---|---|
| 58495 | 3/1923 | Sweden | 16/366 |
| 175 | 2/1909 | United Kingdom | 16/371 |
| 2144569 | 7/1984 | United Kingdom . | |
| 2200783 | 1/1988 | United Kingdom . | |

Primary Examiner—David L. Talbott
Attorney, Agent, or Firm—Lewis H. Eslinger; Jay H. Maioli

[57] ABSTRACT

A holding structure for a displaying apparatus for a socalled wrap top type electronic apparatus includes a first holding portion and a second holding portion on each lateral side of the displaying apparatus. The first holding portion is turnably connected to one end of a holding member having its other end turnably carried by the main body of an electronic apparatus, whilst the second holding portion is slidably held by a slide guide member provided on the main body of the electronic apparatus for extending in its for and aft direction. A frictional unit is provided at least at one of the swinging portions between the first holding portion and a holding member, between a second holding portion and a slide guide member and between the holding member and the main body of the electronic apparatus for turnably holding the displaying apparaus with respect to the main body of the apparatus while enabling the pivot point of turning of the displaying apparatus with respect to the main body of the electronic apparatus to be moved back and forth with the opening and closure of the displaying apparatus and reducing the amount of shift of the center of gravity of the displaying apparatus to enlarge the size of the displaying apparatus.

11 Claims, 10 Drawing Sheets

HOLDING STRUCTURE FOR DISPLAYING APPARATUS

BACKGROUND OF THE INVENTION AND RELATED ART STATEMENT

This invention relates to a holding structure for a displaying apparatus employed in, for example, a word processor or a personal computer. More particularly, it relates to a novel holding structure for a displaying apparatus frequently used in a so-called lap-top word processor or a personal computer in which the displaying apparatus is provided at a portion on the ceiling plate side of an electronic apparatus and turned and opened with respect to the main body of the electronic apparatus to expose the display surface, and in which the mounting manner of the displaying apparatus with respect to the main body of the electronic apparatus is improved to permit the size of the displaying apparatus to be increased as desired.

The displaying apparatus in which the inner side of the lid of the main body of the electronic apparatus contributes to reduction in size of the electronic apparatus, and is frequently employed in, for example, a lap-top word processor or personal computer.

Figure 1:
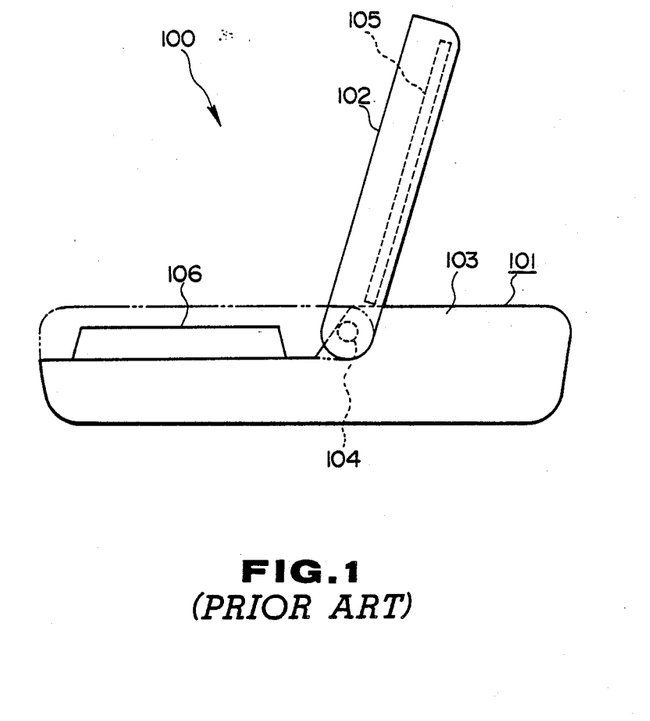
FIG. 1 is a side elevation showing an example of a conventional electronic apparatus provided with a displaying apparatus.

FIG. 1 shows the construction of a conventional lap-top word processor 100.

The word processor 100 shown in FIG. 1 is in the form of a flat rectangular box 101 constituting a main body 103 of an electronic apparatus of the word processer 100. The forward half portion of the ceiling plate side of the casing 101 serves as a displaying apparatus 102, the remaining portion serving as the main body of the electronic apparatus 103. The displaying apparatus 102 is turnably mounted via a hinge 104 at about the center in the fore and aft direction of the main body 103. The inner side of the displaying apparatus 102 serves as a display surface 105, which is presented towards the front side when the displaying apparatus 102 is turned and opened with respect to the main body 103.

An input section 106 is provided on a portion of the main body 103 confronted by the displaying surface of the displaying apparatus 102. This input section 106 faces toward the outside of the main body 103 upon opening the displaying apparatus 102.

The hinge 104 interconnecting the displaying apparatus 102 and the main body 103 is provided with suitable friction means whereby the displaying apparatus 102 may be maintained in the tilted state relative to the main body 103 at any desired angle.

In this type of the lap-top word processor 100, the size of the displaying apparatus 102 is about half that of the displaying apparatus 102. Hence, with reduction in size of the wrap top word processor 100, the size of the displaying surface 105 of the displaying apparatus 102 is correspondingly reduced to affect the visibility of the displaying surface 105.

Figure 2:
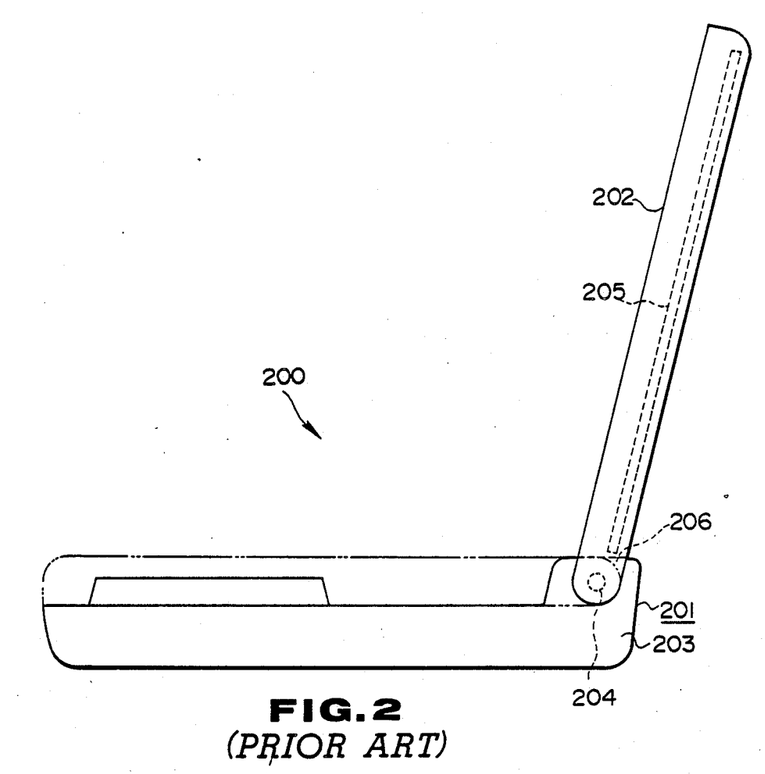
FIG. 2 is a side elevation showing another example of another conventional electronic apparatus provided with a displaying apparatus shown in its opened state.
Figure 3:
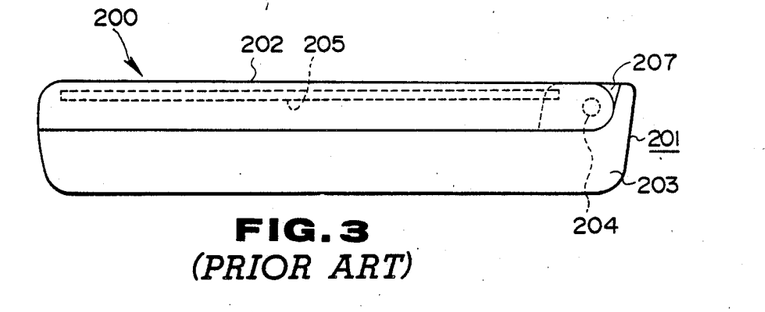
FIG. 3 is a side elevation showing the same apparatus as shown in FIG. 2, with the displaying apparatus being shown in its closed state.

In order to cope with such reduction in size of the displaying surface of the displaying apparatus, there is known a lap-top word processor 200 arranged as shown in FIGS. 2 and 3.

This word processor 200 is so arranged that the size ratio of the displaying apparatus 202 to the casing 201 is increased so that substantially the overall surface, for example, of the ceiling plate side of the casing 201 serves as the displaying apparatus 202, which is connected with a hinge unit 204 to the main body of the electronic apparatus 203 at the respective rear ends thereof.

In this case, the size of the displaying apparatus 202 is not so small as compared with that of the word processor 100, so that it is possible to increase the displaying surface 205.

However, in this word processor 200, a problem is raised that the word processor 200 becomes unstable when the displaying apparatus 202 is in the opened state.

Thus, when the displaying apparatus 202 is opened and erected upright with respect to the main body 203, the center of gravity of the word processor 200 is shifted towards the upper rear side. Since the preferred position of the displaying surface 205 is normal to the viewing direction, the displaying apparatus 202 is used in many cases at a position in which it is tilted at more than a right angle with respect to the main body of the apparatus 203, resulting in increased instabilities of the word processor 200.

Moreover, the hinge unit 204 of the displaying apparatus 202 has its center of rotation arranged at approximately the center of the plate thickness of the displaying apparatus 202 and hence a clearance 206 need be provided to prevent collision of the rear edge of the displaying apparatus 202 against the main body of the apparatus 203 during turning of the displaying apparatus 202 with respect to the main body of the apparatus 203. Hence, as shown in FIG. 3, an upwardly opened groove 207 is necessarily formed between the rear edge of the displaying apparatus 202 and the clearance 206 upon closing the display apparatus 202 to detract from the appearance as well as to permit intrusion of dust and dirt and to affect the opening and closure operation of the displaying apparatus 202.

It is therefore on object of the present invention to provide a holding structure for a displaying apparatus whereby it becomes possible to increase the size of the displaying surface of the displaying apparatus for a word processor or a personal computer.

It is another object of the present invention to provide a holding structure for a displaying apparatus in which the opening angle of the displaying apparatus with respect to the main body of the electric apparatus may be enlarged for realizing better visibility.

It is a further object of the present invention to provide a holding structure for a displaying apparatus in which the stability of the electronic apparatus such as a word processor or a personal computer placed on a table may be attained even when the opening angle of the displaying apparatus with respect to the main body of the electronic apparatus is increased.

According to the present invention, there is provided a displaying apparatus for a so-called lap-top electronic apparatus wherein a first holding portion and a second holding portion are provided on both sides of the apparatus, the first holding portion is turnably connected to one end of a holding member having its other end held turnably by the main body of the apparatus, the second holding portion is slidably held by a slide guide member provided on the main body of the electronic apparatus for extending in its fore and aft direction, and wherein friction means are provided at at least one of the swinging portions between the first holding portion and the holding member, between the second holding portion and the slide guide member and between the holding member and the main body of the electronic apparatus.

In the holding structure of the displaying apparatus of the present invention, the displaying apparatus may be reduced in size, since when the displaying apparatus is turned with respect to the main body of the apparatus, the first holding portion of the displaying apparatus is movable vertically with respect to the main body, whilst the second holding portion is movable back and forth with respect to the main body of the apparatus. Hence, shifting of the center of gravity of the displaying apparatus caused by the opening and closing of the displaying apparatus may be reduced and hence the displaying apparatus per se is not affected in stability even when the opening angle of the displaying apparatus in increased.

The above and other objects, advantages and features of the present invention will become apparent from the following description especially when read in conjunction with the accompanying drawings.

DETAILED DESCRIPTION OF PREFERRED EMBODIMENTS

Illustrative embodiments of a holding structure for a displaying apparatus according to the present invention, as applied to a lap-top word processor, are explained hereinbelow.

A first embodiment of the supporting structure for a display apparatus according to the present invention is now explained by referring to the drawings.

A word processor 1, to which the present invention is applied, has a casing 2 in the form of a rectangular box, as shown in FIG. 1. This casing 2 is divided into a first section 2a accounting for about two thirds of an upper half of the casing 2, and a remaining section or second section 2b.

A displaying apparatus 3 is accommodated in the inside of the first section 2a, whilst a main body 4 of an electronic apparatus comprised of electronic components is accommodated within the second section 2b.

The displaying apparatus 3 is supported rotatably with respect to the main body 4, and a displaying surface 3a is formed on the surface of the displaying apparatus 3 facing the main body 4 and is exposed towards front when the displaying apparatus 3 is turned in the opening direction with respect to the main body 4.

A keyboard 5 of the word processor 1 has a number of key switches 6 on the surface of the main body 4 facing to the displaying surface 3a of the displaying apparatus 3. The keyboard 5 is also exposed by the turning movement of the displaying apparatus 3 similarly to the displaying surface 3a of the displaying apparatus 3.

The displaying apparatus 3 is turnably supported with respect to the main body 4 by holding means 7, 7.

Those holding means 7, 7 interconnect both lateral sides of the displaying apparatus 3 and both lateral sides on the ceiling plate side of the main body 4. Since the holding means 7, 7 are of the same structure by reason of the transverse symmetry of the apparatus, the following description will be made only of one of the holding means 7 located on the might-hand side when viewed from the front side.

Figure 4:
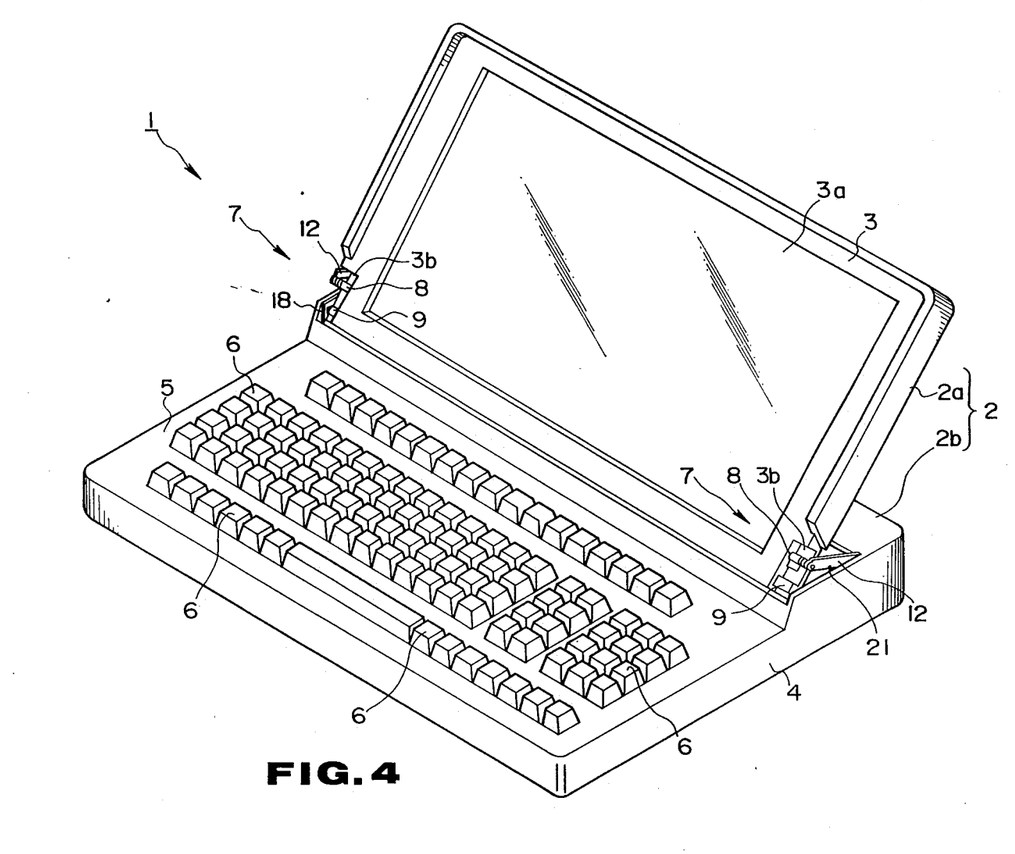
FIG. 4 is a perspective view showing a lap-top word processor to which a holding structure for the displaying apparatus according to the present invention is applied.
Figure 5:
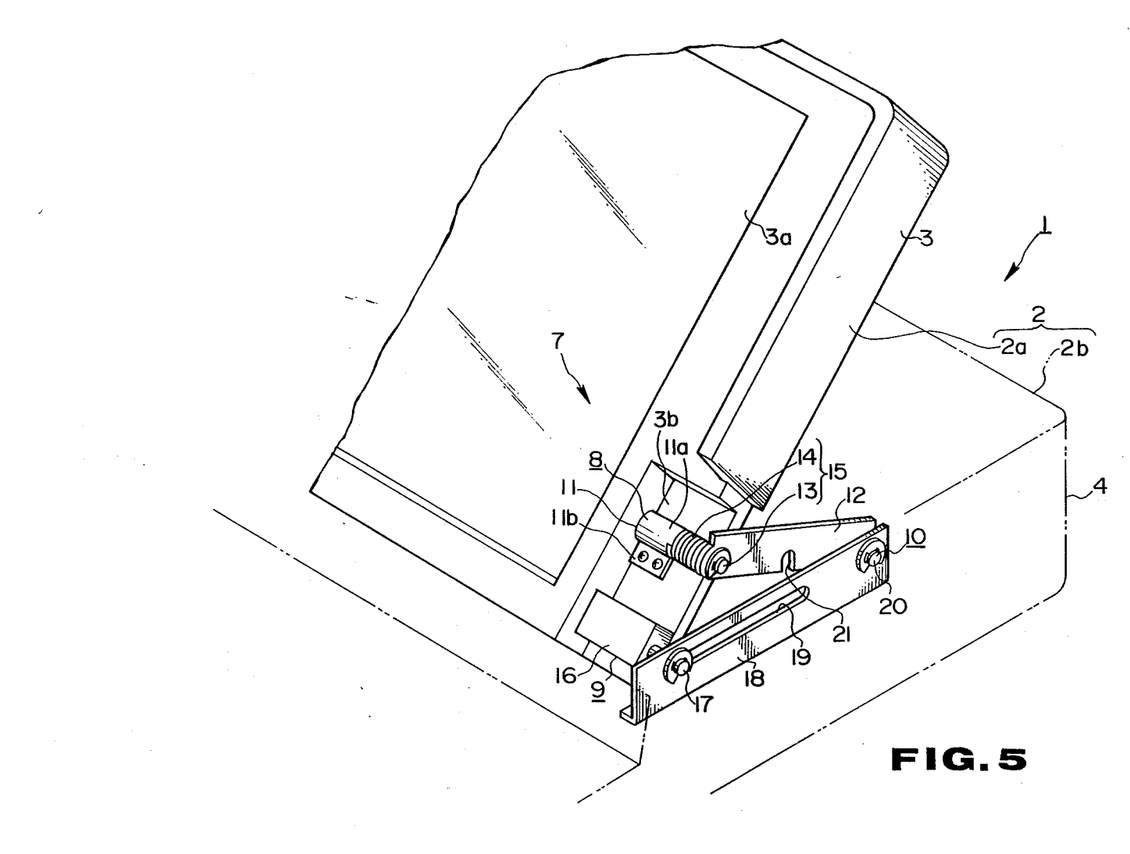
FIG. 5 is an enlarged perspective view showing essential parts of the structure shown in FIG. 4.

As shown in FIGS. 4 and 5, the holding means 7 hold the displaying apparatus 3 and the main body 4 at three points. The first point is a holding portion between the displaying apparatus 3 and a holding member, referred to hereinafter as a first holding portion 8, the second point is a holding portion between the displaying apparatus 3 and a slide guide member of the main body 4, referred to hereinafter as a second holding portion 9 and the third point is a rotational pivot portion 10 between the holding member and the main body 4.

As shown in FIG. 5, the first holding portion 8 is constituted by a turnable connection between a bearing 11 secured in a recess 3b on the lower lateral rear side of the displaying apparatus 3 and a first supporting shaft 13 unturnably supported at one end to a holding member in the form of a plate 12.

Figure 7:
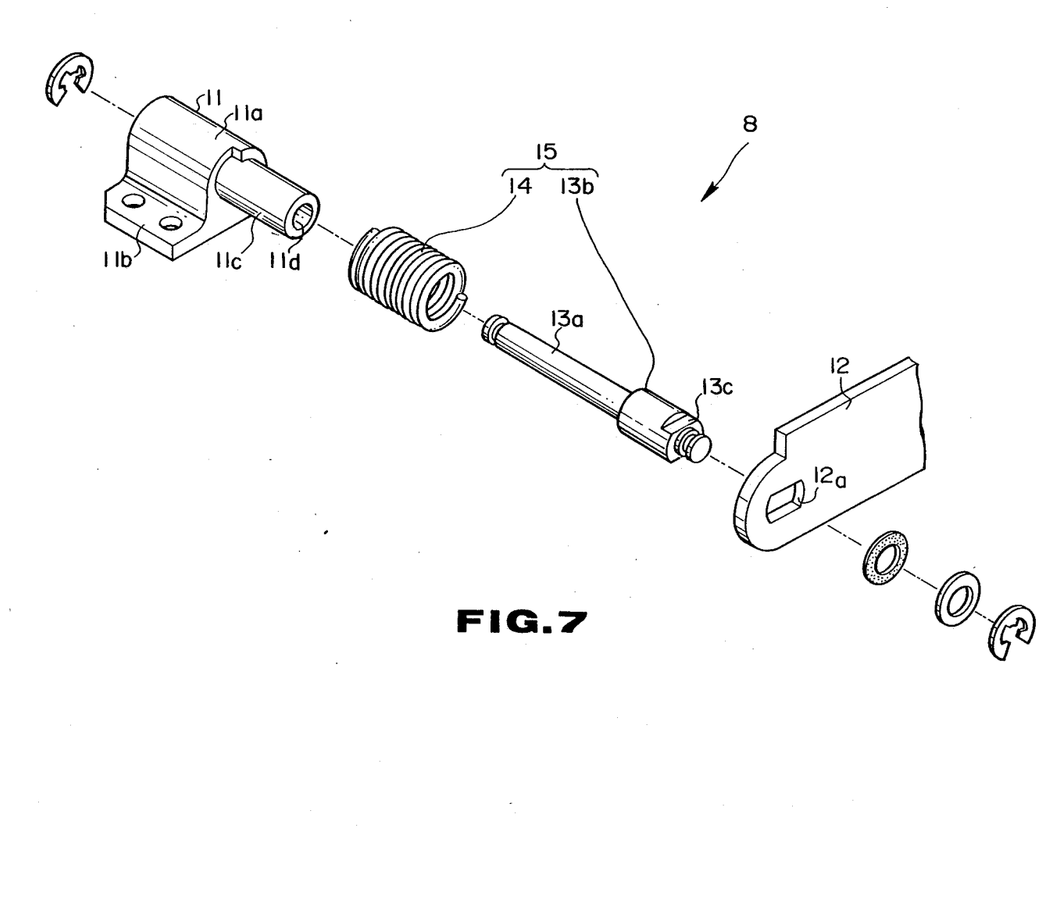
FIG. 7 is an enlarged exploded perspective view showing a frictional unit constituting the holding structure for the displaying apparatus.

Referring to FIG. 7, the bearing 11 is composed of a semicylindrical portion 11a into which fits the first supporting shaft 13, an attachment piece 11b extending tangentially from the outer surface of the semicylindrical portion 11a and a spring retaining portion 11c having an outside diameter slightly less than the portion 11a and extending axially from one end face of the portion 11a. A holding bore 11d having a diameter about equal to or slightly larger than the outside diameter of the first supporting shaft 13 is formed in continuation to the spring retaining portion 11.

A coil spring 14 attached to the spring retaining portion 11 has a length longer than that of the spring retaining portion 11, such that, when the spring is fitted on the retaining portion 11, it is projected beyond the outer end face of the retaining portion 11. The coil spring 14 is secured to the portion 11 by suitable means, such as adhesion. The bearing 11 constructed in this manner has its attachment piece 11b secured by a set screw at the forward position within the recess 3b of the displaying apparatus 3.

As shown in FIG. 7, the first supporting shaft 13 associated with the bearing 11 has a lesser diameter portion 13a fitted into the holding bore 11d of the bearing 11, a larger diameter portion 13b tightly fitted into the coil spring 14 and a non-circular portion 13c formed at the foremost part of the larger diameter portion 13b and fitted into a connecting through-hole 12a formed in the end of the supporting member 12. The first supporting shaft 13 has its lesser diameter portion 13a and the larger diameter portion 13b introduced into the bearing 11 so as not to be extricated from the bearing 11, while the non-circular portion 13c, while having its non-circular portion 13c unturnably fitted into the connecting through-hole 12a of the supporting member 12 so as not to be extricated at the foremost part thereof from the supporting member 12.

In the first supporting portion 8 of the displaying apparatus 3, a frictional unit 15 is formed by a press fit between the inner surface of the coil spring 14 and the outer surface of the first supporting shaft 13, as shown in FIG. 5, such that a force acts to prevent the first supporting shaft 13 from being turned relative to the bearing 11 to maintain the displaying apparatus 3 at any tilt angle during its opening on closing operation.

In the frictional unit 15, the first supporting shaft 13 is kept in pressure contact with the inner side of the coil spring 14, the first supporting shaft 13 may be turned lightly in one direction but less lightly in the opposite direction.

Figure 6:
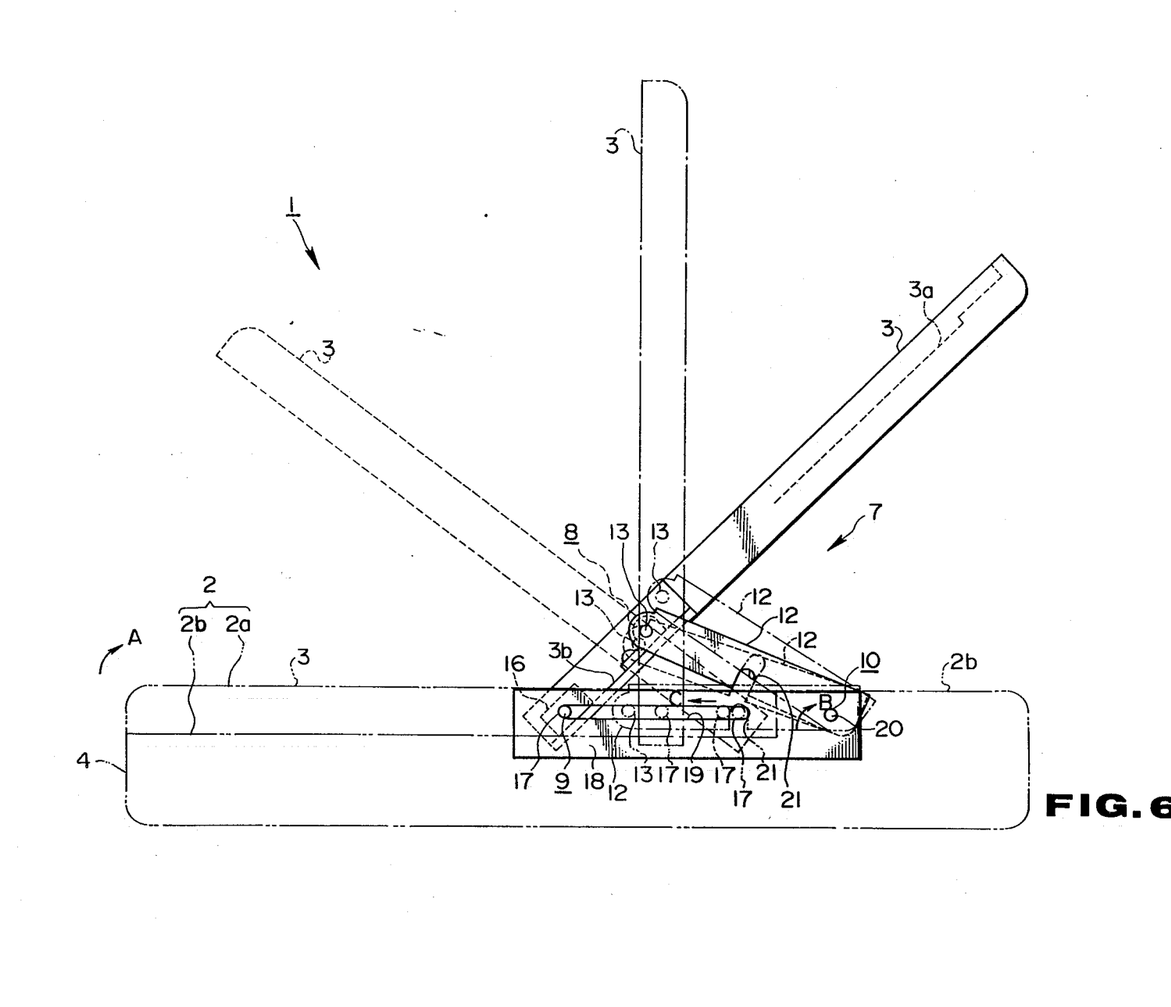
FIG. 6 is a side elevation showing essential parts of the displaying apparatus shown in FIG. 5 for illustrating the movement thereof.

More specifically, when the first supporting shaft 13 pressedly fitted on the inner side of the right hand wind coil spring 14 is turned clockwise in FIG. 6 with respect to the coil spring 14, the friction between the first supporting shaft 13 and the coil spring 14 acts in the direction of enlarging the diameter of the coil spring 14 to release its pressure contact, so that the shaft 13 is turned more lightly. However, in the case wherein the shaft 13 is turned counterclockwise in FIG. 6, the friction between the first supporting shaft 13 and the coil spring 14 acts in the direction of decreasing the diameter of the coil spring 14 to tighten its pressure contact, so that the shaft 13 is turned less lightly. For this reason, in order to prevent the situation in which the displaying apparatus 3 is turned by its own weight at the opening angle of not less than 90° at which the displaying apparatus 3 is used most frequently, as shown in FIG. 6, a right hand wind coil spring is used for the frictional unit 15 located on the right-hand side towards the displaying apparatus 3, while a left hand wind coil spring is used for the frictional unit 15 on the left-hand side towards the apparatus 3. On the other hand, when both side coil springs 14 are wound in the same direction, the force of friction acts similarly for the opening and closing directions. Which of these two systems is to be adopted depends on various conditions, such as usage or the size of the displaying apparatus.

The second holding portion 9 is formed by the connection between a second supporting shaft 17 unturnably secured to a shaft securing member 16 secured in each recess 3b of the displaying apparatus 3 at a position rearwardly of the bearing 11 of the first holding member 8 and an oblong hole 19 of a slide guide member 18 secured to the main body 4 for extending in the fore and aft direction thereof referring to FIG. 6, the slide guide members 18 are provided with a spacing from each other about equal to the width of the displaying apparatus 3 towards left and right lateral sides of the ceiling plate of the main body 4 and at about the center in the fore and aft direction. The second holding shaft 17 of the displaying apparatus 3 is passed through the oblong hole 19 of the slide guide member 18, as shown in FIG. 5, and is provided with an end E-ring for preventing extrication of the shaft 17. In this manner, the rear end of the displaying apparatus 3 is movable in the fore and aft direction with respect to the main body 4, as it is guided by the slide guide member 18.

Referring to FIG. 5, the swinging portion 10 is formed by a third holding shaft 20 secured to the end of the holding member 12 turnably held at the other end by the first holding portion 8 on the lateral side of the displaying apparatus 3 and a small through-hole formed at the rear end of the slide guide member 18.

The third holding shaft 20 thus inserted into the small through-hole in the slide guide member 18 is provided with an E ring for preventing its extrication.

Referring to FIG. 6, the holding member 12 is turnably held at the swinging portion 10 by the slide guide member secured to the main body 4.

A downwardly opening recess 21 is formed at the mid point of the holding member 12. This recess 21 acts as a clearance into which the second holding shaft 17 is intruded when the displaying apparatus 3 is closed with respect to the main body 4.

The holding unit 7 of the displaying apparatus 3, as described in the foregoing, operates in the following manner.

When the displaying apparatus 3 is closed with respect to the main body 4, as indicated by double-dotted chain line in FIG. 6, the holding portions 8 and 9 and the swinging portion 10 are arrayed along a straight horizontal line, when viewed laterally in FIG. 6. When the opening operation is started from this closed position by uplifting the displaying apparatus 3 at the forward part thereof as shown by an arrow mark A in FIG. 6, the holding member 12 starts to be turned, as indicated by the arrow mark B in FIG. 6, with the swinging portion 10 as center, with the holding shaft 17 of the second holding portion 9 of the displaying apparatus 3 being guided along the long opening 19 in the slide guide member 18 so as to be moved forwards as indicated by the arrow mark C in FIG. 6, the displaying apparatus 3 being turned so that its forward portion is directed upwards and its rear portion is moved forwards, as indicated by the broken line in FIG. 6. When the displaying apparatus 3 is at right angles with the ceiling plate of the main body 4, as indicated by the chaindotted line in FIG. 6, a straight line interconnecting the first holding portion 8 and the second holding portion 9 is normal to a straight line interconnecting the second holding portion 9 and the swinging portion 10, with the first holding portion 8 then assuming the highest position within the range of possible movement thereof.

When the displaying apparatus 3 is turned further so that the displaying surface 3a is directed upwards, as indicated by the arrow mark A in FIG. 6, the holding shaft 13 of the first holding portion 8 is moved in the reverse direction in the path of movement thereof, as the holding shaft 17 of the second holding portion 9 is moved forwards as indicated by the arrow mark C in FIG. 6. Thus the displaying apparatus 3 may be tilted until the second holding shaft 17 abuts on a forward edge of the long opening 19 in the slide guide member 18.

Meanwhile, the displaying apparatus 3 may be maintained in its tilted state at any position within the range of possible movement thereof in the first holding portion 8 on account of the above described frictional unit 15.

A second embodiment of the holding unit of the displaying apparatus according to the present invention is hereinafter explained.

The word processor 21 of the illustrative second embodiment differs from the word processor 1 of the first embodiment only with respect to the mounting position and the structure of the frictional unit, so that the remaining portions are indicated by the same reference numerals as those used in the first embodiment and the corresponding description is omitted.

More specifically, in the word processor 21 of the illustrative second embodiment, the frictional unit is provided between the second holding portion and the slide guide member.

Figure 11:
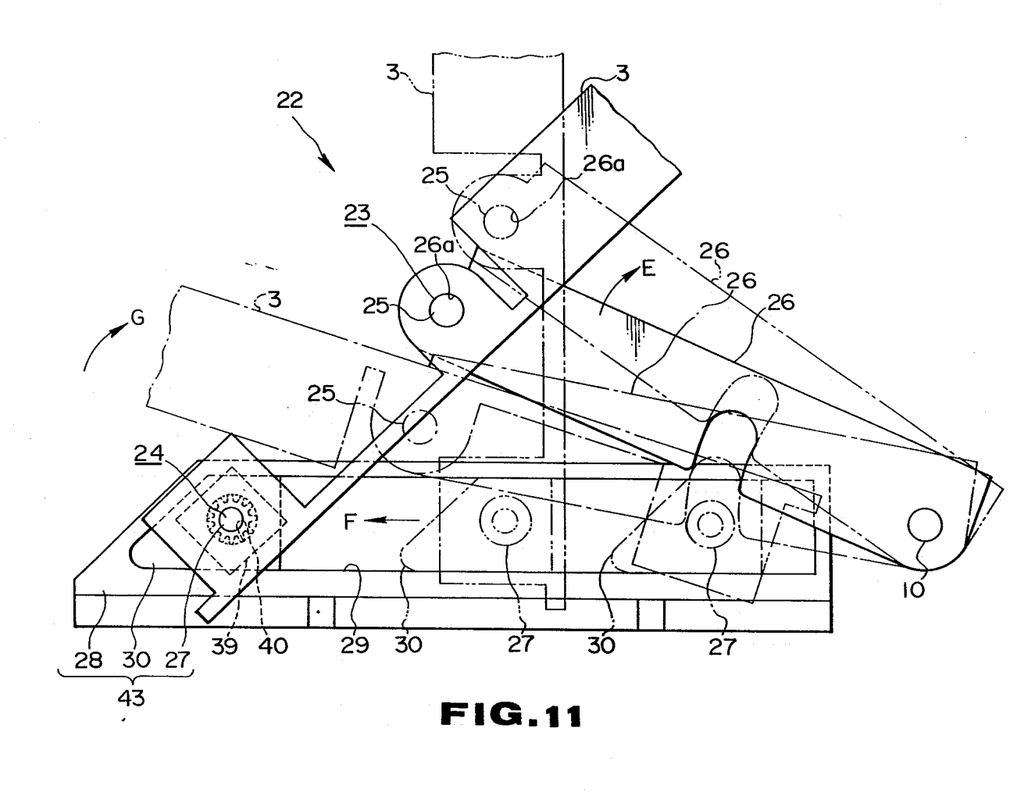
FIG. 11 is a side elevation showing essential parts of the holding structure shown in FIG. 10 for illustrating the movement thereof.

Referring to FIG. 11, the displaying apparatus 3 is turnably supported at three points with respect to the main body 4 by holding means 22, 22. The first holding portion 23 is a holding point between the displaying apparatus 3 and the holding member, the second holding portion 24 is a holding point between the displaying apparatus 3 and the slide guide member of the main body 4 and the swinging portion 10 acting as the third holding portion is a holding point between the holding member and the main body 4.

In the following, only the left hand side holding unit 22, as viewed from the front side of the main body 4, is explained.

Figure 8:
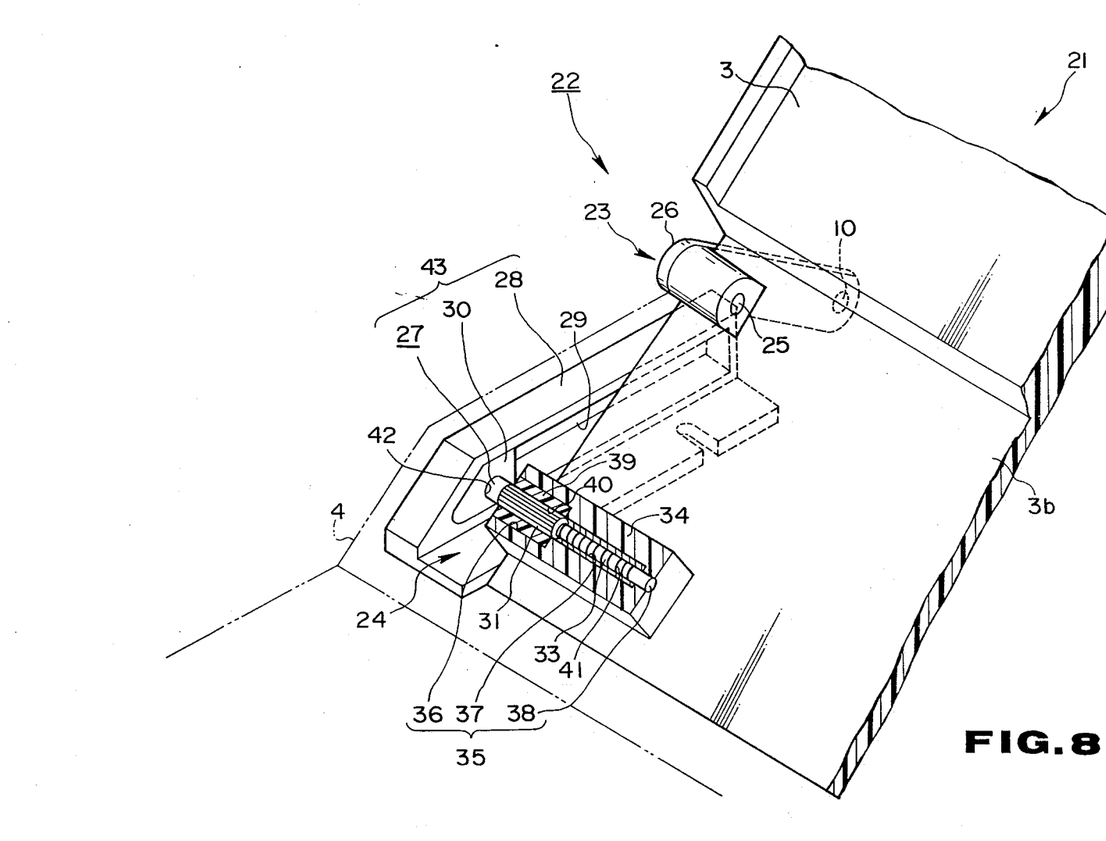
FIG. 8 is a perspective view showing essential parts of another embodiment of the holding structure according to the present invention.
Figure 10:
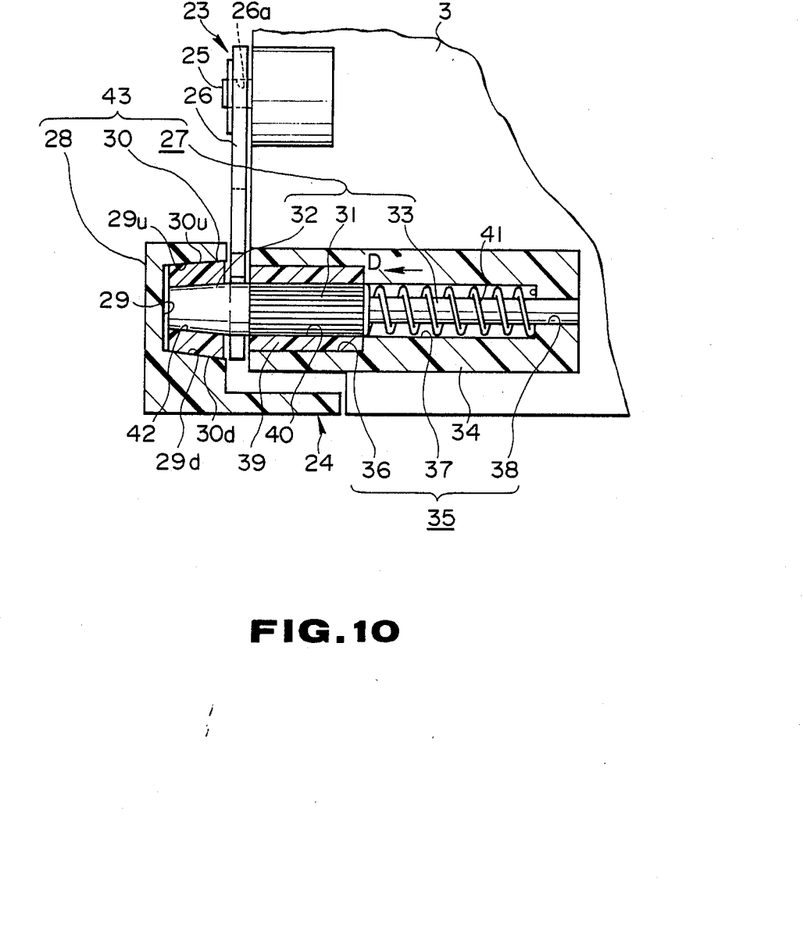
FIG. 10 is an enlarged sectional view showing essential parts of the holding structure shown in FIG. 9.

Referring to FIGS. 8 and 10, the first holding portion 23 includes a laterally protruding first holding shaft 25 secured in the reces 3b on the lower rear lateral side of the displaying apparatus 3 and turnably fitted in a connecting through-hole 26a formed at one end of a holding member in the form of a plate 26.

Figure 9:
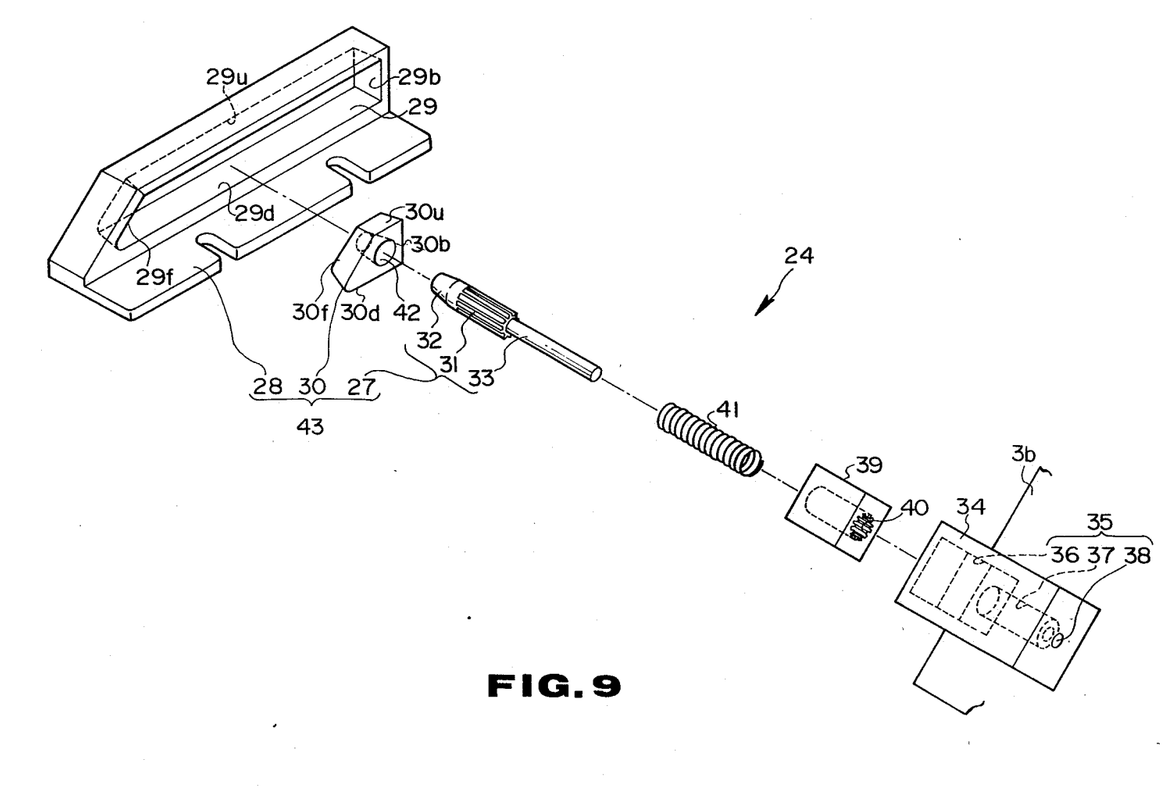
FIG. 9 is an exploded perspective view of a frictional unit constituting the holding structure according to a modified embodiment of the present invention.

Referring to FIGS. 8, 9 and 10, the second holding portion 24 includes a second holding shaft 27 unturnably mounted in the recess 3b at a position rearwardly of the first holding shaft 25 of the first holding member 23, a slide guide member 28 secured to the main body 4 for extending in the fore and aft direction and a slider 30 slidably engaged in a guide groove 29 and turnably supported by the second holding shaft 27.

This second holding shaft 27 formed of, for example, PPT resin, is formed with a splined shaft 31 towards its foremost part, a tapered portion 32 ahead of the splined shaft 31 and a lesser diameter shaft portion 33 towards the rear of the splined shaft 31.

As shown in FIG. 8, this second holding shaft 27 is supported by a holding shaft holding portion 34 in the form of a rectangular block disposed in the recess 3b of the displaying apparatus 3. A central holding opening 35 opened on the outer surface of the block is formed by a square section 36, an intermediate section 37 and a lesser diameter section 38 extending in this order towards the inner side from the opening end. The square section 3b is rectangular in cross section and has the length of one side thereof significantly larger than the outside diameter of the splined shaft 31. The intermediate section 37 has a circular cross section and a diameter about equal to the outside diameter of the splined shaft 31, while the lesser diameter section 38 is of such a size and shape as to receive the lesser diameter portion 33 of the second holding shaft 27.

Into the square section 36 of the holding opening 35 in the holding portion 34 is fitted a spline bearing member 39 into which is fitted in turn the splined shaft portion 31 of the second holding shaft 27, as shown in FIGS. 8 and 10. This spline bearing member 39 is in the form of a rectangular block and a spline bearing bore 40 is formed through the center of the bearing member 39 for receiving the splined shaft portion 31 of the second holding shaft 27. The spline shaft member 39 is fitted into the square section 36 of the holding opening 35 and secured thereto such as by an adhesive in such a manner that the splined bearing opening 40, the intermediate section 37 and the lesser diameter section 38 are aligned with one another.

A coil spring 41 is fitted about the lesser diameter shaft portion 33 of the second holding shaft 27 within the intermediate section 37 of the holding opening 35. The coil spring 41 is accommodated in the unloaded state, that is, with its spontaneous length, between the inner end face of the splined bearing member 39 and the recessed surface of the intermediate section 37, with the splined bearing member 39 fitted in the square section 36 of the holding opening 35, as shown in FIG. 10.

The second holding shaft 27 is held turnably and axially movably as it is inserted into the holding opening 35 and the splined shaft portion 31 is fitted into the splined bearing opening 40 of the splined bearing member 39. When the second holding shaft is thrusted towards the inner side of the holding opening 35, the coil spring 41 is compressed by the rear end face of the splined shaft 31, so that the second holding shaft is biased by the compressed coil spring so as to be moved outword.

The slide guide member 28 is formed of, for example, phenol resin, and is U-shaped in cross-section, as indicated in FIG. 9. The guide member 28 is secured to the main body 4 with the guide groove 29 extending in the fore and aft direction, as indicated in FIG. 11. The guide groove 29 has an upper wall section 29u and a lower wall section 29d that are parallel to each other in the transverse direction and are inclined to approach to each other in a direction from the opening edge towards the inner side. The guide groove 29 also has a substantially vertically extending rear wall section 29b and a front end wall 29f that is directed obliquely towards the front side in the direction of the lower wall section 29d.

The slider 30 is formed of, for example, polyoxymethylene resin, and, as shown in FIG. 9, has a transverse thickness which is slightly lesser than the depth of the guide groove 29 of the slide guide member 28. The slider 30 has an upper surface and a lower surface 30d that run parallel to each other in the fore and aft direction for mating with the wall sections 29u, 29d of the guide groove 29 and that are formed as inclined along the depth of the guide groove 28. The slider also has a forward end face 50f which is inclined for mating with the forward end wall 29f of the guide groove 29 and a substantially vertically extending rear end face 30b.

Referring to FIG. 9, the slider 30 is formed substantially centrally with a holding shaft inserting opening 42 extending through the transverse thickness thereof and formed as a tapered surface for mating with the tapered portion 32 of the second holding shaft 27.

Referring to FIGS. 8 and 10, the second holding portion 24 is so arranged and constructed that the taper portion 32 of the second holding shaft 27 unturnably and slidably carried within the holding opening 35 of the holding shaft holding portion 34 of the displaying apparatus 3 is fitted into the through-hole 42 of the slider 30 which in turn is fitted in the guide groove 29 of the slide guide member 28 for sliding in the fore and aft direction. The second holding shaft 27 is biased by the coil spring 41 so as to be projected perpetually outwardly as indicated by the arrow mark D in FIG. 10.

Referring to FIG. 10, the taper portion 32 is kept in pressure contact with the through-hole 42 in the slider 30, whilst the upper surface 30u and the lower surface 30d of the slider 30 are kept in pressure contact with the upper wall section 29u and the lower wall section 29d of the guide groove 29 of the slide guide member 28, respectively.

The holding unit 22 for the displaying apparatus 3 operates in the following manner.

When the displaying apparatus 3 is closed with respect to the main body 3, the holding portions 23 and 24 and the swinging portion 10 are arrayed along a straight horizontal line, when viewed laterally and from the forward side of the main body 4. When the opening operation is started from this closed position by uplifting the displaying apparatus 3 at the forward part thereof as shown by an arrow mark A in FIG. 6, the holding member 26 starts to be turned, as indicated by the arrow mark E in FIG. 11, with the swinging portion 10 as center, with the slider 30 of the second holding portion 24 of the displaying apparatus 3 being guided along the guide groove 29 in the slide guide member 28 so as to be moved forwards as indicated by the arrow mark F in FIG. 11, the displaying apparatus 3 being turned so that its forward portion is directed upwards and its rear portion is moved forwards, as indicated by the arrow mark G in FIG. 11. When the displaying apparatus 3 is at right angles with the ceiling plate of the main body 4, a straight line interconnecting the first holding portion 23 and the second holding portion 24 is normal to a straight line interconnecting the second holding portion 24 and the swinging portion 10, as indicated by double dotted chain line in FIG. 11, with the first holding portion 23 when assuming the highest position within the range of possible movement thereof.

When the displaying apparatus 3 is turned further so that the displaying surface 3a is directed upwards, as indicated by the arrow mark G in FIG. 11, the holding shaft 25 of the first holding portion 23 is moved in the reverse direction in the path of movement thereof, as the slider 30 of the second holding portion 24 is moved forwards as indicated by the arrow mark F in FIG. 11. Thus the displaying apparatus 3 may be tilted until the second slider 30 abuts on a forward edge of the guide groove 29 in the slide guide member 28.

Meanwhile, in the course of the opening or closing of the displaying apparatus 3, the slide guide member 28, slider 30 and the second holding shaft 27 act as a frictional unit 43 in the following manner.

That is, since the guide groove 29 of the slide guide member 28, the upper surface 30u and the lower surface 30d of the slider 30 are kept in pressure contact with one another, as mentioned hereinabove, a frictional force acts, when the slider 30 is slid in the guide groove 29 in a direction to inhibit such sliding. When the displaying apparatus is inclined with respect to the main body 4, the second holding shaft 27 is turned with respect to the slider 30, since the second holding shaft 27 is not turnable with respect to the displaying apparatus. However, since the holding shaft holding opening 42 of the slider 30 and the tapered portion 32 of the second holding shaft 27 are kept in pressure contact with each other, as mentioned hereinabove, a frictional force acts to inhibit turning of the second holding shaft 27. Each member acts as the frictional unit 43 so that the tilted state of the main body 4 of the displaying apparatus 3 may be maintained steplessly within the range of possible opening and closure of the main body 4.

In the foregoing description, the frictional unit is provided between the first holding portion 8 and the holding member 12 in the first embodiment and between the guide groove 29 of the slide guide member 28 and the slider 30 on one hand and between the slider 30 and the second holding shaft 27 on the other. However, this is only illustrative and the frictional unit may also be provided at the swinging portion 10 between the holding member 12 and the main body 4.

It will be appreciated from the foregoing that the present invention provides a holding structure for the displaying apparatus, wherein, when the displaying apparatus is turned relative to the main body, the first holding portion of the displaying apparatus is moved vertically relative to the main body, whilst the second holding portion is movable in the fore and aft direction, so that movement in the fore and aft direction of the center of gravity of the displaying apparatus as a result of the opening and closure of the displaying apparatus is reduced with the result that the displaying apparatus per se is not degraded in stability when the opening degree of the displaying apparatus is increased and hence the apparatus may be increased in size.

What is claimed is:

1. A portable electronic apparatus having a display device, comprising: a main body of the electronic apparatus rotatably connected with the display device;
   a key board mounted on an upper side portion of said main body; and
   a holding structure for holding the display device rotatably connected with the main body, so that when said display device is erected by said holding structure, said keyboard and a visual displaying surface of said display device are brought to a viewing position and when said display device is laid down, said key board is covered by said display device, so that the portable electronic apparatus has a substantially compact cuboidal shape;
   said holding structure being formed at a lower portion of said display device, wherein a lower edge of said display device is moved in the fore and aft direction along said main body by said holding structure.

2. Apparatus according to claim 1, wherein said display device is held by a first holding part of said holding structure at a mid portion of said display device.

3. Apparatus according to claim 2, wherein one side of said first holding part is rotatably attached to a side portion of said display device forming a first holding portion, another side of said holding part is rotatably attached to a side portion of said main body forming a pivot point.

4. Apparatus according to claim 3, wherein said holding structure includes two of said holding parts, each said holding part is attached at respective side portions of said display device.

5. Apparatus according to claim 4, wherein said holding structure further includes a second holding part attached to said main body and
   said lower edge of said display device has said second holding portion linked to said main body by said second holding part, said second holding part comprising slidable means for moving said lower edge of said display device in the fore and aft direction.

6. Apparatus according to claim 5, wherein said holding structure further includes friction means for restraining the movement in the fore and aft direction of said lower edge at any point along the travel of said display device.

7. Apparatus according to claim 6, wherein said friction means is formed on said first holding portion.

8. Apparatus according to claim 6, wherein said friction means is formed on said second holding portion.

9. Apparatus according to claim 6, wherein said friction means is formed on said pivot point.

10. Apparatus according to claim 1, wherein said portable electronic apparatus is a personal computer.

11. Apparatus according to claim 10, wherein said personal computer is a word processor.

* * * * *